United States Patent
Kashiwazaki et al.

(10) Patent No.: US 11,815,715 B2
(45) Date of Patent: Nov. 14, 2023

(54) PLANAR OPTICAL WAVEGUIDE DEVICE

(71) Applicant: Nippon Telegraph and Telephone Corporation, Tokyo (JP)

(72) Inventors: Takahiro Kashiwazaki, Musashino (JP); Takeshi Umeki, Musashino (JP); Osamu Tadanaga, Musashino (JP); Koji Embutsu, Musashino (JP); Nobutatsu Koshobu, Musashino (JP); Asuka Inoue, Musashino (JP); Takushi Kazama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/774,075

(22) PCT Filed: Nov. 11, 2019

(86) PCT No.: PCT/JP2019/044067
§ 371 (c)(1),
(2) Date: May 3, 2022

(87) PCT Pub. No.: WO2021/095084
PCT Pub. Date: May 20, 2021

(65) Prior Publication Data
US 2022/0390672 A1    Dec. 8, 2022

(51) Int. Cl.
*G02B 6/12* (2006.01)
(52) U.S. Cl.
CPC ............... *G02B 6/12007* (2013.01)
(58) Field of Classification Search
None
See application file for complete search history.

(56) References Cited

U.S. PATENT DOCUMENTS

| 5,113,524 A | 5/1992 | Hirota et al. |
| 6,091,870 A * | 7/2000 | Eldada ............... G02B 6/12007 385/24 |

(Continued)

FOREIGN PATENT DOCUMENTS

| JP | H02-36622 A | 2/1990 |
| JP | H02-93524 A | 4/1990 |

(Continued)

OTHER PUBLICATIONS

Translation of JP2014-2228639A (Year: 2014).*

(Continued)

*Primary Examiner* — Chad H Smith
(74) *Attorney, Agent, or Firm* — Workman Nydegger

(57) ABSTRACT

A balanced homodyne detection optical circuit according to the present disclosure is a planar optical waveguide circuit in which a circuit made of an optical waveguide including a dielectric or a semiconductor is formed on a substrate, the balanced homodyne detection optical circuit including an input port of local oscillator light and an input port of measurement light (squeezed light (including excitation light)), wherein a wavelength demultiplexing circuit which demultiplexes only the measurement light is arranged immediately after the input port of measurement light, a 50% multiplexing/demultiplexing circuit is arranged which causes squeezed light having been demultiplexed by the wavelength demultiplexing circuit and the local oscillator light to respectively branch at a branching ratio of 50% and to interfere with each other, and two output ports are arranged to which two outputs from the 50% multiplexing/demultiplexing circuit are guided.

10 Claims, 10 Drawing Sheets

(56) References Cited

U.S. PATENT DOCUMENTS

| | | |
|---|---|---|
| 9,653,882 B1 | 5/2017 | Matsushita et al. |
| 2019/0109649 A1 | 4/2019 | Denoyer et al. |

FOREIGN PATENT DOCUMENTS

| | | | |
|---|---|---|---|
| JP | H03-192929 A | | 8/1991 |
| JP | 2014228639 A | * | 12/2014 |

OTHER PUBLICATIONS

Takahiro Kashiwazaki et al., *WDM Coupler for Signal and Second Harmonic Pump Based on Silica-Based PLC for Hybrid Integration of Linear and Nonlinear Optical Devices*, 22nd Microoptics Conference (MOC2017), Nov. 19, 2017, pp. 44-45.

* cited by examiner

PLANAR OPTICAL WAVEGUIDE DEVICE

TECHNICAL FIELD

The present disclosure is related to an integrated circuit for performing balanced homodyne detection.

BACKGROUND ART

In continuous-variable quantum information technology, a quadrature-amplitude squeezed state (hereinafter, squeezed light) is an important state to be used as an auxiliary input state that is necessary for realizing various quantum gates. Squeezed light is light in which quantum fluctuations of two non-commuting observables are controlled and represents a state where the quantum fluctuation with respect to one of the non-commuting observables is smaller than a quantum fluctuation in a coherent state. Using the squeezed light enables, for example, a generation of quantum entanglement which is a most important operation in quantum information processing to be performed.

Squeezed light is generated using a non-linear optical phenomenon. When using a second-order non-linear optical effect, squeezed light is generated by spontaneous parametric down-conversion (SPDC). SPDC is a phenomenon in which a higher-frequency photon incident to a second-order non-linear optical medium is converted into a pair of photons of a lower frequency. On the other hand, when using a third-order non-linear optical effect, squeezed light is generated by four-wave-mixing. In the case of four-wave-mixing, a new correlated photon pair is generated from two photons with equal frequency. Both SPDC and four-wave-mixing require relatively strong excitation light, and a part of an excitation light component is converted into squeezed light inside the non-linear optical medium. At present, research on squeezed state generation is being conducted using various structures and materials toward the realization of quantum information processing, and evaluating squeezing performance is also considered an important technique.

Homodyne measurement is used to measure squeezed light. Homodyne detection techniques enable phase-sensitive detection with respect to weak optical signals at a single photon level and are frequently used in the field of optical quantum information processing. In recent years, a balanced homodyne detection technique that is an improvement over homodyne detection has been proposed and is utilized as a coherent ising machine or a receiving system in continuous-variable optical quantum information processing. Balanced homodyne detection is a method in which measurement light and local oscillator light are caused to interfere with each other using a 50% beam splitter, two beams of output light are respectively received by different photodetectors, and an electric field component of the measurement light is acquired from a difference in intensities of obtained electrical signals. As things stand, in various applied techniques, a balanced homodyne detection system is realized by a free space optical system that is a relatively large system in which various optical components are arranged on an optical surface plate.

CITATION LIST

Non Patent Literature

[NPL 1] T. Kashiwazaki, et. al., "WDM coupler for signal and second harmonic pump based on silica-based PLC for hybrid integration of linear and nonlinear optical devices," Proc. Of 22nd Microoptics Conference (MOC), Tokyo, Japan, Nov. 19-22, 2017, p. 44-45

SUMMARY OF THE INVENTION

Since squeezed light returns to a coherent state when sustaining light loss, it is essential that homodyne detection is performed with a low-loss configuration. In balanced homodyne detection, increasing a degree of optical interference between local oscillator light and squeezed light in a beam splitter is also important. This is because a non-interfering component corresponds to sustaining light loss. In addition, since homodyne detection is a phase-sensitive measurement, disturbance factors to the system are desirably kept to a bare minimum. Furthermore, while it is important to realize measurement with good reproducibility, with free space optical systems, it is difficult to maintain a positional relationship among the optical components over a long period of time.

The present disclosure represents a method of solving the problems described above and an object thereof is to provide a balanced homodyne reception optical circuit with high stability.

Specifically, in order to realize a degree of optical interference in a half beam splitter that is an important component in homodyne detection in a stable manner, the use of an optical interference method based on a waveguide structure instead of a conventional optical interference method based on a free space optical system is proposed.

A planar optical waveguide device according to the present disclosure includes: an input port of local oscillator light; an input port of measurement light; a wavelength demultiplexing circuit which demultiplexes only the measurement light from light input to the input port of measurement light; a 50% multiplexing/demultiplexing circuit which causes squeezed light having been demultiplexed by the wavelength demultiplexing circuit and the input local oscillator light to respectively branch at a branching ratio of 50% and to interfere with each other; and two output ports which output light having been branched and output by the 50% multiplexing/demultiplexing circuit.

The present disclosure has an effect of enabling optical interference between local oscillator light and squeezed light to be realized in a stable manner with a smaller configuration than conventional circuits based on a free space optical system.

DESCRIPTION OF EMBODIMENTS

Figure 1:
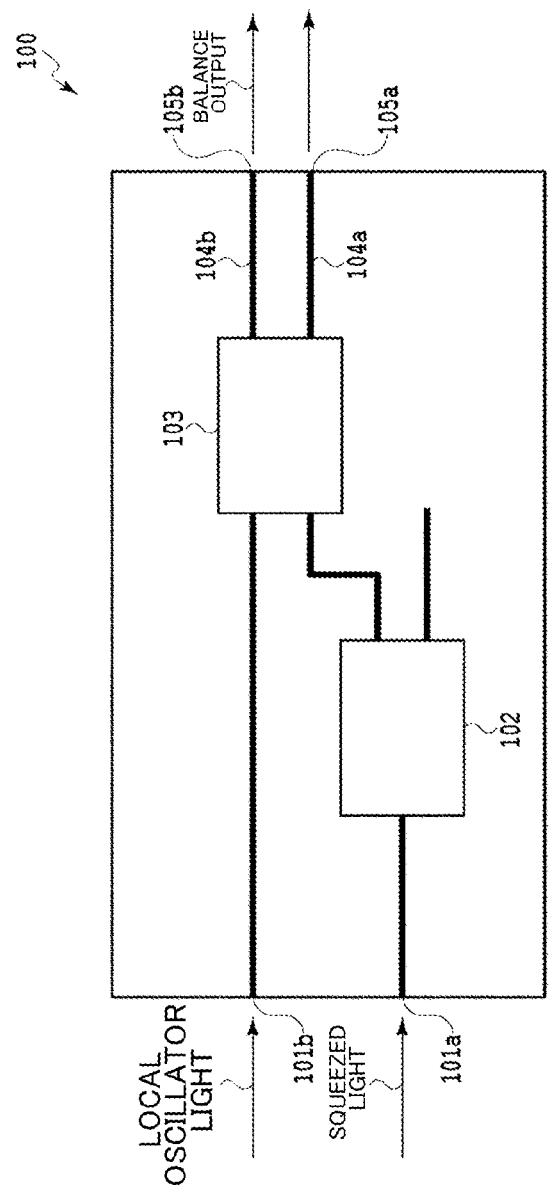
FIG. 1 is a diagram showing a planar optical waveguide device according to an embodiment of the present invention.

FIG. 1 shows a schematic view of a planar optical waveguide device (a balanced homodyne detection circuit) 100 according to an embodiment of the present invention. The planar optical waveguide device 100 includes: an input port 101b of local oscillator light; an input port 101a of measurement light; a wavelength demultiplexing circuit 102 which demultiplexes only the measurement light from light input to the input port 101a of measurement light; a 50% multiplexing/demultiplexing circuit 103 which causes squeezed light having been demultiplexed by the wavelength demultiplexing circuit 102 and the input local oscillator light to respectively branch at a branching ratio of 50% and to interfere with each other; and two output ports 105a and 105b which output light having been branched and output by the 50% multiplexing/demultiplexing circuit.

It is assumed that light emitted from a non-linear optical medium is to be incident to the input port of measurement light and that the light includes components of squeezed light and excitation light. Therefore, in order to correctly measure the squeezed light, the squeezed light and the excitation light must be demultiplexed.

A squeezed light component and an excitation light component are demultiplexed by the wavelength demultiplexing circuit 102 from light input to the input port 101a. The demultiplexed squeezed light component is incident to the 50% multiplexing/demultiplexing circuit 103 in a subsequent stage. Local oscillator light incident from the other input port 101b is incident to another input port of the 50% multiplexing/demultiplexing circuit 103 and interferes with the squeezed light. Two (optical) waveguides 104a and 104b that branch from the 50% multiplexing/demultiplexing circuit are respectively connected to the output ports 105a and 105b.

Figure 2:
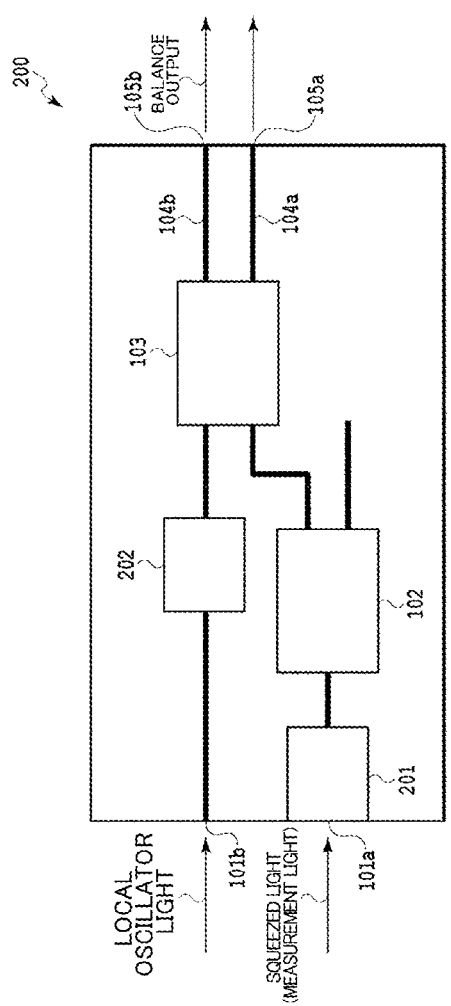
FIG. 2 is a diagram showing a planar optical waveguide device according to the embodiment of the present invention.

FIG. 2 is a diagram showing a planar optical waveguide device 200 according to the embodiment of the present invention. As shown in FIG. 2, the input port 101a of measurement light is desirably provided with a spot size converter (SSC) 201 that converts a mode shape so that light is efficiently coupled to the input port 101a. In particular, squeezed light is most preferably coupled with low loss.

In addition, in measurement of squeezed light, a squeezed level can be measured by scanning an optical phase of local oscillator light. An optical phase control mechanism 202 for performing such a phase scan can be fabricated inside the planar optical waveguide device 200, in which case a homodyne system can be downsized. As shown in FIG. 2, the optical phase control mechanism 202 is installed between the input port 101b of local oscillator light and the 50% multiplexing/demultiplexing circuit 103.

As long as components of excitation light and squeezed light can be demultiplexed, the wavelength demultiplexing circuit 102 may have any kind of element structure such as array waveguide gratings (AWG), a directional coupler (DC), or a multi-mode interference (MMI)-type coupler. Since measurement of squeezed light requires being low-loss, a DC capable of low-loss wavelength demultiplexing is advantageously used (refer to NPL 1).

The 50% multiplexing/demultiplexing circuit 103 may have any kind of element structure such as a multi-mode interference (MMI)-type coupler or a DC as long as optical power can be split at a ratio of 1:1. As the 50% multiplexing/demultiplexing circuit 103, a DC with a high degree of interference and low loss is advantageously used.

While a substance constituting the (optical) waveguides 104a and 104b need only have transparency with respect to a wavelength of the squeezed light, since it is important to keep light loss to a bare minimum in squeezed light measurement, a material with high transparency is preferably selected. Since the larger a refractive index difference between a core and a clad, the smaller the overall size of an element, phase stability of the system improves. However, caution is required since an effect of manufacturing error also increases.

A material that constitutes the present planar optical waveguide devices 100 and 200 need only be transparent with respect to the used light of two wavelength bands including a dielectric or a semiconductor such as silicon, silicon dioxide, lithium niobate, indium phosphorus, and polymers or a compound in which an additive has been added to such dielectrics or semiconductors.

EXAMPLE

FIG. 2 shows a top view of the planar optical waveguide device 200 according to an example of the present invention. The planar optical waveguide is made of a dielectric with $SiO_2$ as a main component, and a waveguide structure includes an additive in a core portion and has a higher refractive index than its surroundings. A material that constitutes the present planar optical waveguide device need only be transparent with respect to squeezed light including a dielectric or a semiconductor such as silicon, silicon dioxide, lithium niobate, indium phosphorus, and polymers or a compound in which an additive has been added to such dielectrics or semiconductors.

It is assumed that the squeezed light in the present example is created by a periodically poled lithium niobate waveguide (hereinafter, a PPLN waveguide) having a second-order non-linear optical effect and, for example, 1.56 μm is assumed as a wavelength of the squeezed light and 0.78 μm is assumed as a wavelength of excitation light.

Figure 3:
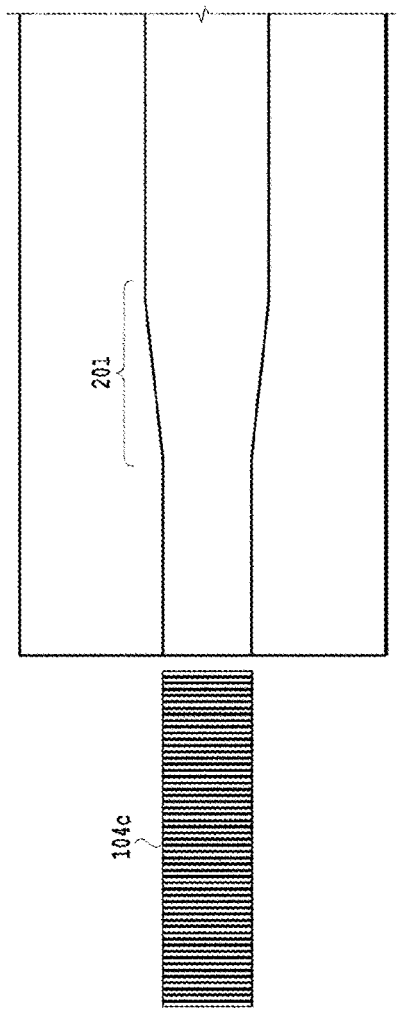
FIG. 3 is a diagram showing a configuration near an input port for measurement light in a planar optical waveguide device according to an example of the present invention.

FIG. 3 is a diagram showing a configuration near the input port 101a for measurement light in the planar optical waveguide device 200. As shown in FIG. 3, the spot size converter 201 is formed on the input port 101a for measurement light and designed so as to resemble, as closely as possible, a mode shape at an end surface of a PPLN waveguide 104c so that light from the PPLN waveguide 104c is efficiently coupled to a waveguide inside an element of the planar optical waveguide device.

Figure 4:
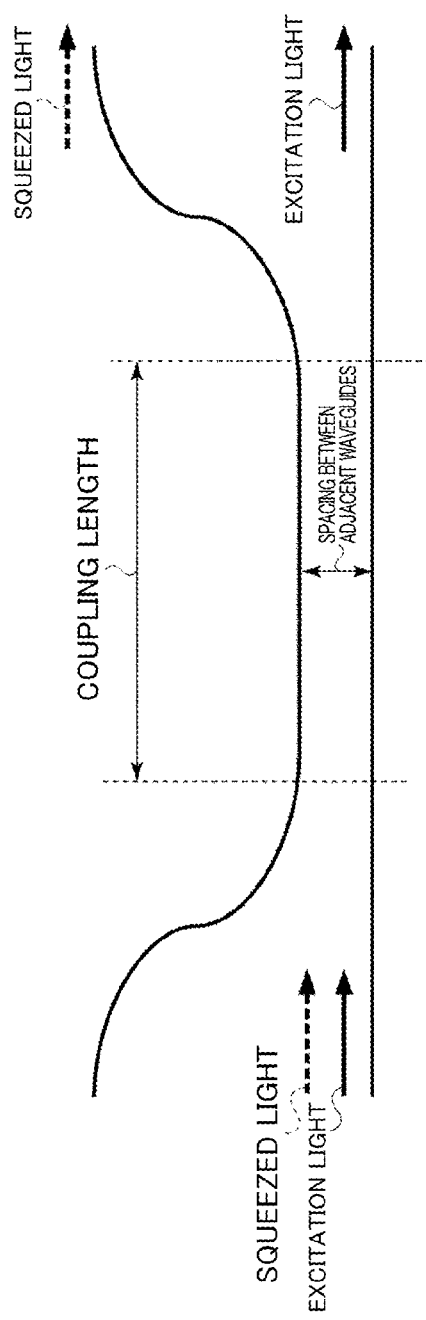
FIG. 4 is a diagram showing optical demultiplexing by a directional coupler-type wavelength demultiplexing circuit that is one wavelength demultiplexing circuit in the planar optical waveguide device according to the example of the present invention.

FIG. 4 is a diagram showing optical demultiplexing by a directional coupler-type wavelength demultiplexing circuit that is one wavelength demultiplexing circuit in the planar optical waveguide devices 100 and 200. As shown in FIG. 4, a directional coupler is adopted as the wavelength demultiplexing circuit 102. As described in NPL 1, the present coupler is capable of demultiplexing light of 0.78 μm and light of 1.56 μm with low loss. In the present directional coupler, squeezed light is demultiplexed to a cross port.

Figure 7:
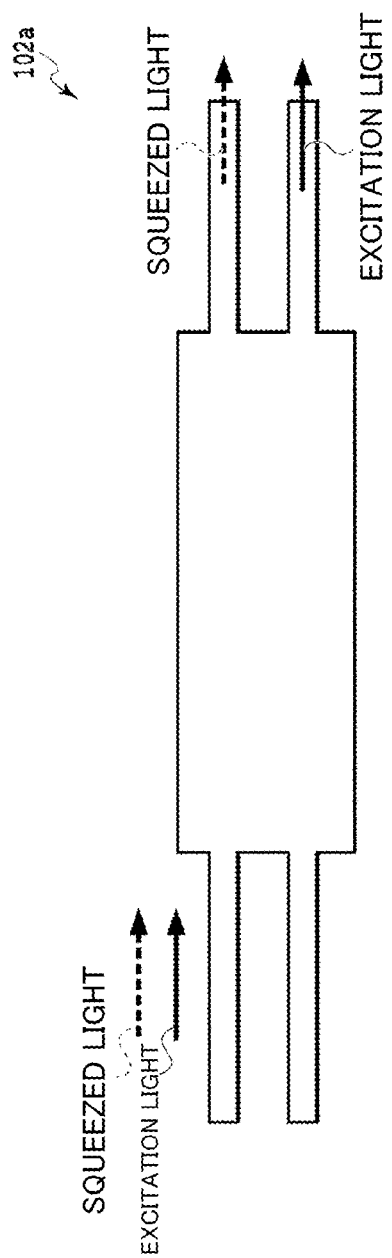
FIG. 7 is a diagram showing a multimode interference-type (MMI-type) circuit that is one wavelength demultiplexing circuit in the planar optical waveguide device according to the example of the present invention.

Alternatively, the wavelength demultiplexing circuit 102 may be a multimode interference-type (MMI-type) (optical) circuit 102a such as that shown in FIG. 7. The multimode interference-type (MMI-type) circuit 102a is effective against squeezed light using a second-order non-linear optical effect. Wavelengths of the excitation light and the squeezed light characteristically differ from one another by twice or half.

Figure 9:
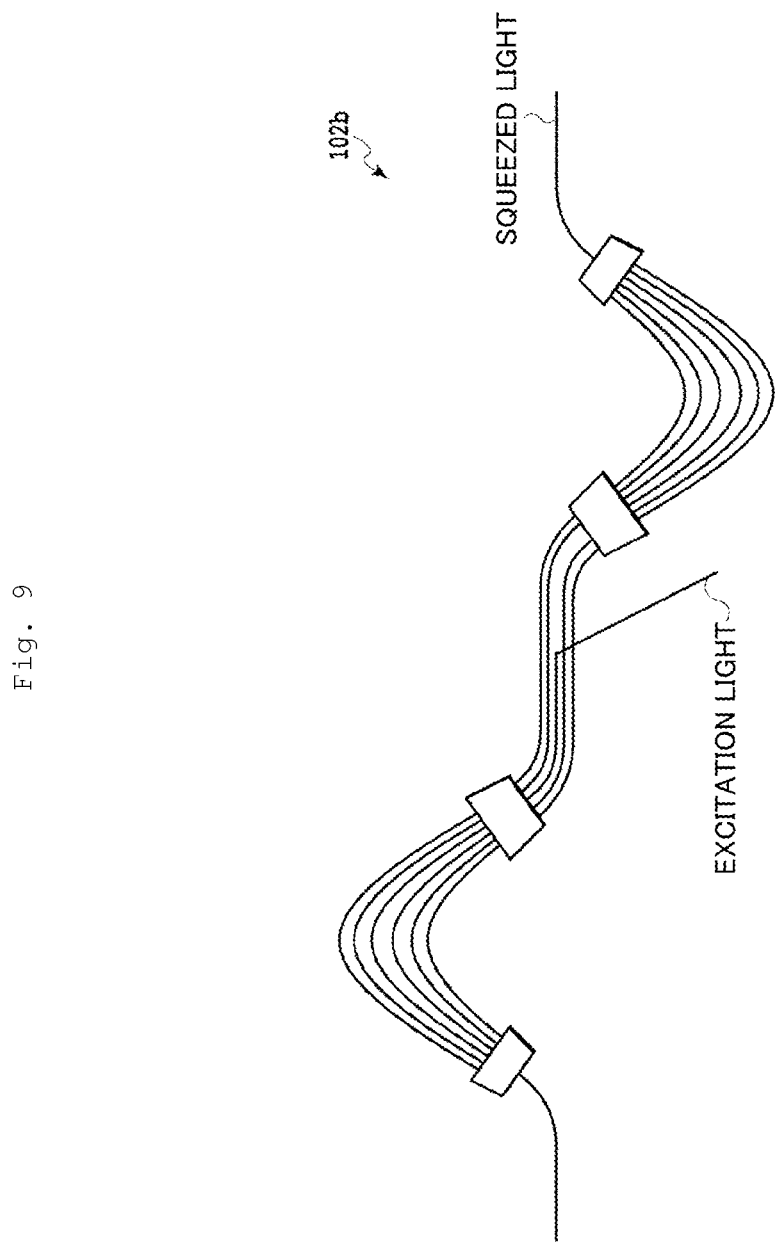
FIG. 9 is a diagram showing an AWG-type wavelength demultiplexing circuit that is one wavelength demultiplexing circuit in the planar optical waveguide device according to the example of the present invention.

In addition, in the case of squeezed light generated by a third-order non-linear optical effect, since excitation light exists at a central frequency of the squeezed light, an AWG-type wavelength demultiplexing circuit 102b such as that shown in FIG. 9 is preferably used. The AWG-type wavelength demultiplexing circuit 102b is effective against squeezed light using a third-order non-linear optical effect. Wavelengths of the excitation light and the squeezed light are characteristically close to each other.

Figure 5:
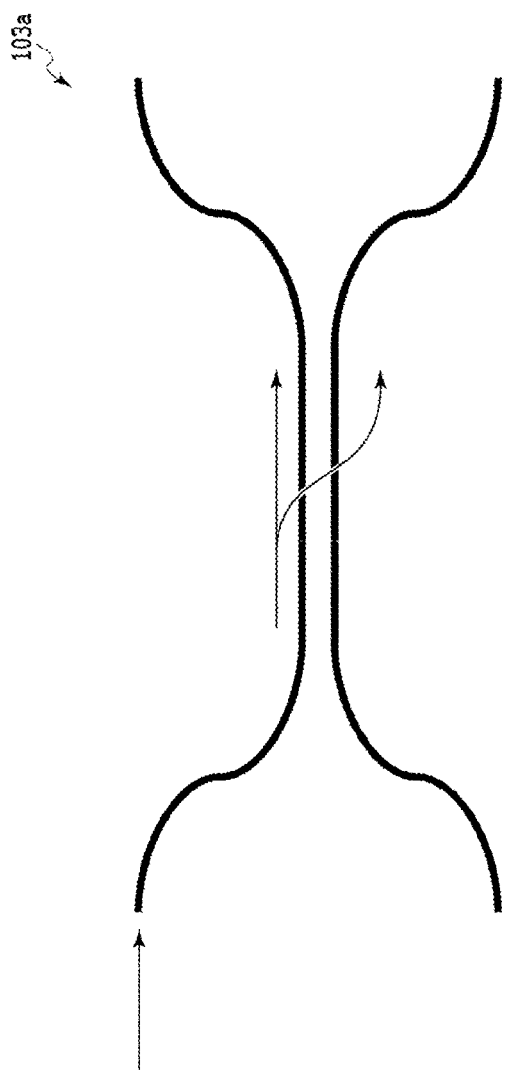
FIG. 5 is a diagram showing a directional coupler that is one 50% multiplexing/demultiplexing circuit in the planar optical waveguide device and branching of optical power by the directional coupler according to the example of the present invention.
Figure 8:
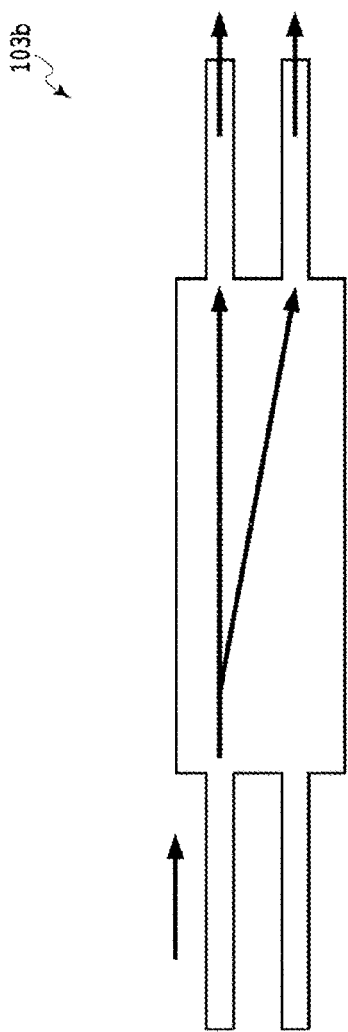
FIG. 8 is a diagram showing a multimode interference-type (MMI-type) circuit that is one 50% multiplexing/demultiplexing circuit in the planar optical waveguide device according to the example of the present invention.
Figure 10:
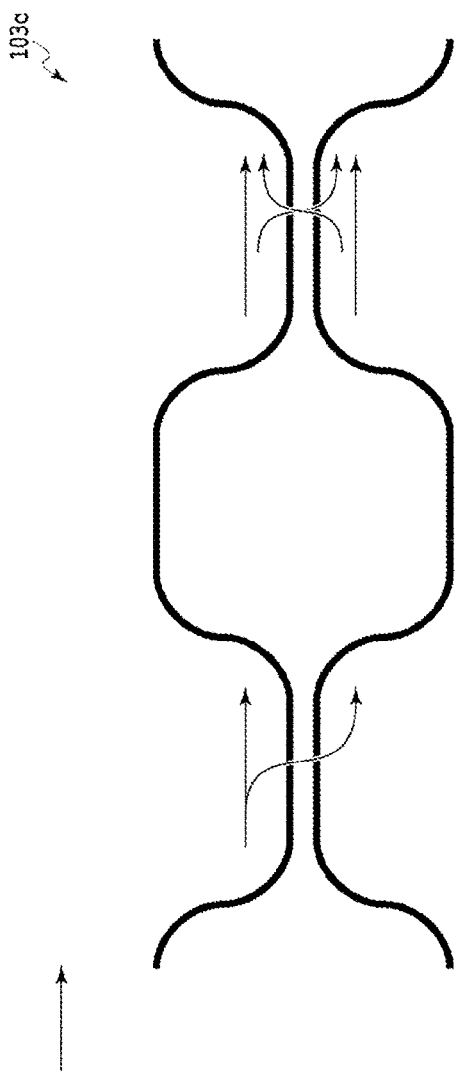
FIG. 10 is a diagram showing a Mach-Zehnder-type optical branch circuit that is one 50% multiplexing/demultiplexing circuit in the planar optical waveguide device according to the example of the present invention.

A directional coupler 103a such as that shown in FIG. 5 is adopted as the 50% multiplexing/demultiplexing circuit 103. The directional coupler 103a enables optical power to be branched at a ratio of 50:50. Optical interference by the directional coupler 103a is known to have a high degree of interference and low light loss. Alternatively, the 50% multiplexing/demultiplexing circuit may be a multimode interference-type (MMI-type) (optical) circuit 103b such as that shown in FIG. 8 or a Mach-Zehnder-type optical branch circuit 103c such as that shown in FIG. 10. The Mach-Zehnder-type optical branch circuit 103c has: an optical branch circuit which branches light incident from the input port 101b and the wavelength demultiplexing circuit 102; and an optical multiplexing circuit which multiplexes light having been branched and output from the optical branch circuit and which outputs the multiplexed light to the output ports 105a and 105b.

Figure 6:
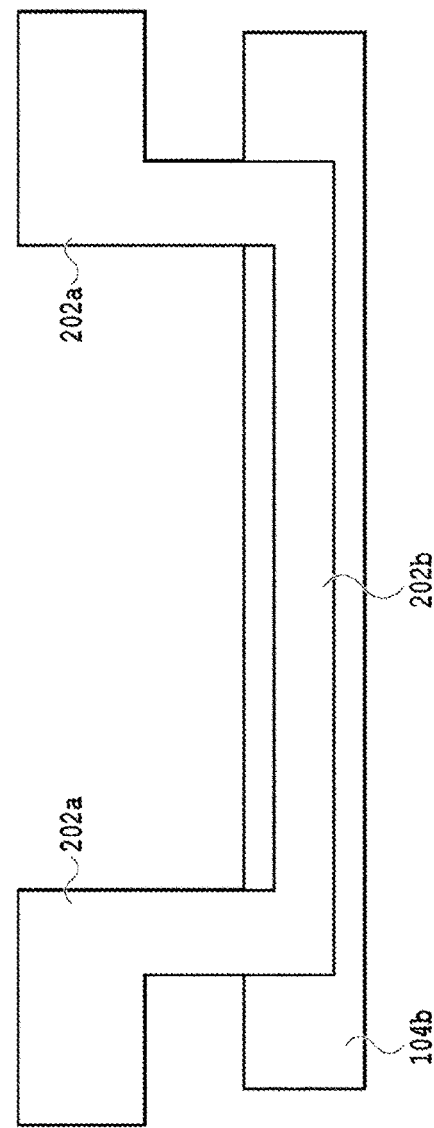
FIG. 6 is a diagram showing an optical phase control mechanism in the planar optical waveguide device according to the example of the present invention.

As shown in FIG. 6, a current drive-type optical phase control mechanism 202 is provided between the input port 101b of local oscillator light and the 50% multiplexing/demultiplexing circuit 103. By supplying a current to an electrode pad 202a installed on the waveguide 104b, a heater unit 202b of the electrode generates heat and raises a temperature of the waveguide 104b. A phase scan in homodyne measurement can be realized as the temperature of the waveguide 104b changes locally and a change in a refractive index due to a thermooptical effect of a substance constituting the waveguide 104b causes a phase of light incident to the 50% multiplexing/demultiplexing circuit 103 to change.

The squeezed light and local oscillator light having been multiplexed and demultiplexed by the 50% multiplexing/demultiplexing circuit 103 are respectively emitted to the outside of the planar optical waveguide device (element) from the two output ports 105a and 105b. The two beams of light emitted from the element are converted into electrical signals by different photoreceptors and an output difference between the electrical signals is measured by an electric spectrum analyzer.

While an electrical signal obtained when light is not incident from the input port 101a of squeezed light represents a shot noise, it was confirmed that a signal with an equal or lower shot noise level is received by inputting squeezed light, thereby succeeding in demonstrating a measurement of squeezed light by the present planar optical circuit.

INDUSTRIAL APPLICABILITY

The present disclosure can be applied to a technical field of integrated circuits for performing balanced homodyne detection.

The invention claimed is:

1. A planar optical waveguide device, comprising:
an input port of local oscillator light;
an input port of measurement light, the measurement light including a squeezed light component and an excitation light component;
a wavelength demultiplexing circuit that receives only the measurement light from the input port of measurement light and which demultiplexer only the measurement light received from the input port of measurement light, the wavelength demultiplexing circuit separating the squeezed light component from the excitation light component when demultiplexing the received measurement light, the wavelength demultiplexing circuit having a first output path for outputting the squeezed light component and a second output path for outputting the excitation light component;
a 50% multiplexing/demultiplexing circuit that has a first input path that is coupled to the input port of local oscillator light such that only the local oscillator light is received via the first input path and a second input path that is coupled to the first output path of the wavelength demultiplexing circuit such that only the squeezed light component is received via the second input path, the 50% multiplexing/demultiplexing circuit causing the squeezed light received from the wavelength demultiplexing circuit via the second input path and the input local oscillator light received from the input port of local oscillator light via the first input light to respectively branch at a branching ratio of 50% and to interfere with each other; and
two output ports which output light having been branched and output by the 50% multiplexing/demultiplexing circuit.

2. The planar optical waveguide device according to claim 1, wherein the 50% multiplexing/demultiplexing circuit is any one of a multimode interference-type optical circuit, a directional coupler-type multiplexing/demultiplexing circuit, and a Mach-Zehnder-type optical branch circuit.

3. The planar optical waveguide device according to claim 1, wherein the wavelength demultiplexing circuit is a multimode interference-type optical circuit or a directional coupler-type wavelength demultiplexing circuit.

4. The planar optical waveguide device according to claim 1, wherein an optical phase control mechanism is arranged between the input port of local oscillator light and the 50% multiplexing/demultiplexing circuit.

5. The planar optical waveguide device according to claim 1, wherein a spot size converter is arranged at the input port of measurement light.

6. The planar optical waveguide device according to claim 1, wherein the planar optical waveguide device includes a dielectric or a semiconductor.

7. The planar optical waveguide device according to claim 2, wherein the planar optical waveguide device includes a dielectric or a semiconductor.

8. The planar optical waveguide device according to claim 3, wherein the planar optical waveguide device includes a dielectric or a semiconductor.

9. The planar optical waveguide device according to claim 4, wherein the planar optical waveguide device includes a dielectric or a semiconductor.

10. The planar optical waveguide device according to claim 5, wherein the planar optical waveguide device includes a dielectric or a semiconductor.

* * * * *